US005712336A

United States Patent [19]
Gareiss et al.

[11] Patent Number: 5,712,336
[45] Date of Patent: Jan. 27, 1998

[54] FLAMEPROOFED THERMOPLASTIC MOLDING MATERIALS

[75] Inventors: Brigitte Gareiss, Obersülzen; Manfred Knoll, Wachenheim; Christoph Plachetta, Limburgerhof, all of Germany

[73] Assignee: BASF Aktiengesellschaft, Ludwigshafen, Germany

[21] Appl. No.: 843,298

[22] Filed: Apr. 14, 1997

Related U.S. Application Data

[63] Continuation of Ser. No. 624,252, Mar. 29, 1996, abandoned.
[51] Int. Cl.$^6$ ....................................... C08K 5/11
[52] U.S. Cl. ................ 524/373; 524/310; 524/311; 524/312; 524/314; 524/411; 524/412
[58] Field of Search ....................... 524/310, 311, 524/312, 314, 411, 412, 373

[56] References Cited

U.S. PATENT DOCUMENTS

| | | | |
|---|---|---|---|
| 3,516,957 | 6/1970 | Gray et al. | 524/605 |
| 4,086,212 | 4/1978 | Bier et al. | 524/469 |
| 4,530,953 | 7/1985 | Yoshida | 524/311 |
| 4,548,964 | 10/1985 | Yoshida et al. | 524/311 |
| 4,713,407 | 12/1987 | Bailey et al. | 524/469 |
| 5,008,477 | 4/1991 | Hussain | 570/208 |
| 5,030,778 | 7/1991 | Ransford | 570/208 |
| 5,039,729 | 8/1991 | Brackenridge et al. | 524/412 |
| 5,077,334 | 12/1991 | Hussain | 524/469 |
| 5,135,973 | 8/1992 | Fukasawa et al. | 524/412 |
| 5,371,123 | 12/1994 | Gallucci et al. | 524/412 |

FOREIGN PATENT DOCUMENTS 469 569  2/1992  European Pat. Off. .

*Primary Examiner*—Veronica P. Hoke
*Attorney, Agent, or Firm*—Keil & Weinkauf

[57] ABSTRACT

Flameproofed thermoplastic molding materials contain
A) a thermoplastic polyester,
B) decabromodiphenylethane,
C) a metal oxide or metal sulfide or metal borate or a mixture thereof,
D) an ester of at least one alcohol having at least 3 OH groups and one or more aliphatic mono- or dichaboxylic acids of 5 to 34 carbon atoms and optionally,
E) by weight of conventional additives and processing assistants.

9 Claims, No Drawings

FLAMEPROOFED THERMOPLASTIC MOLDING MATERIALS

This application is a continuation of application Ser. No. 08/624,252, filed on Mar. 29, 1996 abandoned.

The present invention relates to flameproofed thermoplastic molding materials containing A) from 10 to 97.9% by weight of a thermoplastic polyester,
B) from 1 to 20% by weight of decabromodiphenylethane,
C) from 1 to 15% by weight of a metal oxide or metal sulfide or metal borate or a mixture thereof,
D) from 0.1 to 5% by weight of an ester of at least one alcohol having at least 3 OH groups and one or more aliphatic mono- or dicarboxylic acids of 5 to 34 carbon atoms and
E) from 0 to 70% by weight of conventional additives and processing assistants, the percentages by weight of the components A) to E) summing to 100%.

The present invention furthermore relates to the use of the novel molding materials for the production of moldings, in particular for the electrical and electronics industry, and to the moldings obtainable.

It is known, inter alia from EP-A 469 569 and U.S. Pat. No. 5,077,334, that halogen-containing compounds, such as decabromodiphenylethane, are generally used for the preparation of flame-retardant thermoplastics. These publications also mention conventional synergistic agents which are said to reinforce the fire properties substantially.

The disadvantage of flameproofing agents based on halogenated hydrocarbons in thermoplastics, in particular in polyesters, is that the electrical properties deteriorate.

For applications in the electrical and electronics industry, the creep resistance has to be very high.

Here, the CTI value is the current at which the molding is found to exhibit conductivity. The higher the CTI value, the better is the creep resistance of the flameproofed material.

Esters of polyhydric alcohols with mono- or dicarboxylic acids are added as lubricants during processing, as is known, for example, from Taschenbuch der Kunststoff-Additive, published by R. Gächter and H. Müller, Carl Hanser Verlag Munich, 1983, pages 310–353.

It is an object of the present invention to provide flameproofed polyester molding materials which have good flameproofing properties in combination with good electrical properties, in particular good creep resistance.

A further object is to improve the mechanical properties and at the same time the processability, in particular the flowability, of fiber-reinforced, flameproofed polyesters.

We have found that this object is achieved by the molding materials defined at the outset. Preferred embodiments are described in the subclaims.

Surprisingly, we have found that good creep resistance combined with good flameproofing properties can be achieved with polyester molding materials by means of the novel flameproofing combination comprising decabromodiphenylethane, synergistic agents, such as metal oxides, and ester compound(s).

In addition, the novel combination of flameproofing agents increases the elongation at break and toughness of reinforced polyester molding materials, such molding materials surprisingly simultaneously having substantially improved flowability.

The novel molding materials contain, as component (A), from 10 to 97.9, preferably from 20 to 93.9, in particular from 30 to 92.7%, by weight, very particularly from 30 to 80% by weight, of a thermoplastic polyester.

Polyesters based on aromatic dicarboxylic acids and an aliphatic or aromatic dihydroxy compound are generally used. A first group of preferred polyesters comprises polyalkylene terephthalates where the alcohol moiety is of 2 to 10 carbon atoms.

Such polyalkylene terephthalates are known per se and are described in the literature. Their main chain contains an aromatic ring which originates from the aromatic dicarboxylic acid. The aromatic ring may also be substituted, for example by halogen, such as chlorine or bromine, or by $C_1$–$C_4$-alkyl, such as methyl, ethyl, isopropyl, n-propyl, n-butyl, isobutyl or tert-butyl.

These polyalkylene terephthalates can be prepared by reacting aromatic dicarboxylic acids, esters thereof or other ester-forming derivatives with aliphatic dihydroxy compounds in a manner known per se.

Examples of preferred dicarboxylic acids are 2,6-naphthalenedicarboxylic acid, terephthalic acid and isophthalic acid and mixtures thereof. Up to 30, preferably not more than 10, mol % of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Among the aliphatic dihydroxy compounds, diols of 2 to 6 carbon atoms, in particular 1,2-ethanediol, 1,4-butanediol, 1,6-hexanediol, 1,4-hexanediol, 1,4-cyclohexanediol, 1,4-cyclohexanedimethanol and neopentylglycol, and mixtures thereof are preferred.

Examples of particularly preferred polyesters (A) are polyalkylene terephthalates which are derived from alkanediols of 2 to 6 carbon atoms. Among these, polyethylene terephthalate and polybutylene terephthalate and mixtures thereof are particularly preferred.

The relative viscosity of the polyesters (A) is in general from 1.2 to 1.8, preferably from 1.5 to 1.7 (measured in a 0.5% strength by weight solution in a 1:1 w/w phenol/o-dichlorobenzene mixture at 25° C.).

Polyesters whose content of terminal carboxyl groups is up to 100, preferably up to 50, in particular up to 40, meq/kg of polyester are particularly preferred. Such polyesters can be prepared, for example, by the process of DE-A 44 01 055. The content of terminal carboxyl groups is usually determined by a titration method (eg. potentiometry).

A further group comprises wholly aromatic polyesters which are derived from aromatic dicarboxylic acids and aromatic dihydroxy compounds.

Suitable aromatic dicarboxylic acids are the compounds described above for the polyalkylene terephthalates. Mixtures of from 5 to 100 mol % of isophthalic acid and from 0 to 95 mol % of terephthalic acid, in particular mixtures of about 80% of terephthalic acid with 20% of isophthalic acid to mixtures of roughly equivalent amounts of these two acids, are preferably used.

The aromatic dihydroxy compounds are preferably of the general formula I

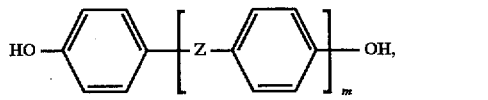

where Z is alkylene or cycloalkylene of up to 8 carbon atoms, arylene of up to 12 carbon atoms, carbonyl, sulfonyl, oxygen or sulfur or a chemical bond and m is from 0 to 2. The compounds I may also carry $C_1$–$C_6$-alkyl, alkoxy, fluorine, chlorine or bromine as substituents on the phenylene groups.

Examples of parent substances of these compounds are dihydroxybiphenyl, di(hydroxyphenyl)alkane, di(hydroxyphenyl)cycloalkane, di(hydroxyphenyl) sulfide, di(hydroxyphenyl) ether, di(hydroxyphenyl) ketone, di(hydroxyphenyl) sulfoxide, α,α'-di(hydroxyphenyl)dialkylbenzene, di(hydroxyphenyl) sulfone, di(hydroxybenzoyl)benzene, resorcinol and hydroquinone and the derivatives thereof which are alkylated in the nucleus or halogenated in the nucleus.

Among these 4,4'-dihydroxybiphenyl, 2,4-di(4'-hydroxyphenyl)-2-methylbutane,

α,α'-di(4-hydroxyphenyl)-p-diisopropylbenzene, 2,2-di(3'-methyl-4'-hydroxyphenyl)propane and 2,2-di(3'-chloro-4'-hydroxyphenyl)propane, and in particular 2,2-di(4'-hydroxyphenyl)propane, 2,2-di(3', 5-dichlorodihydroxyphenyl)propane, 1,1-di(4'-hydroxyphenyl)cyclohexane, 3,4'-dihydroxybenzophenone, 4,4'-dihydroxydiphenylsulfone and 2,2-di(3', 5'-dimethyl-4'-hydroxyphenyl)propane and mixtures thereof are preferred.

Mixtures of polyalkylene terephthalates and wholly aromatic polyesters can of course also be used. These contain in general from 20 to 98% by weight of polyalkylene terephthalate and from 2 to 80% by weight of the wholly aromatic polyester.

For the purposes of the present invention, polyesters are also to be understood as meaning polycarbonates which are obtainable by polymerizing aromatic dihydroxy compound's, in particular bis(4-hydroxyphenyl)-2,2-propane (bisphenol A) or derivatives thereof, for example with phosgene. Corresponding products are known per se and are described in the literature and are for the most part also commercially available. The amount of the polycarbonates is up to 90, preferably up to 50%, by weight, based on 100% by weight of the component (A).

Polyester block copolymers, such as copolyether esters, can of course also be used. Such products are known per se and are described in the literature, for example in U.S. Pat. No. 3,651,014. Corresponding products are also commercially available, for example Hytrel® (DuPont).

The novel molding materials contain, as component (B), decabromodiphenylethane, as flameproofing agent, in amounts of from 1 to 20, preferably from 5 to 15, in particular from 5 to 12%, by weight, based on the total weight of the components A) to E).

Processes for the preparation of the compound are known to a person skilled in the art. The commercially available products are in the form of powders having a melting range of from 345° to 355° C.

Decabromodiphenylethane which is obtainable by the processes of EP-A 469 569 and U.S. Pat. No. 5,077,334 is particularly preferred for the novel flameproofing combination. This product is commercially available under the tradename Saytex® 8010.

The novel molding materials contain, as component C), from 1 to 15, preferably from 5 to 15, in particular from 5 to 12%, by weight of a metal oxide or of a metal sulfide or of a metal borate or of a mixture thereof.

The component C) is to be understood as meaning those oxides, sulfides and/or borates which act as synergistic agent for the flameproofing agent B), ie. considerably increase the flameproofing action.

Examples of metal oxides are zinc oxide, lead oxide, iron oxide, aluminum oxide, tin oxide, magnesium oxide and mixtures thereof, antimony trioxide and/or antimony pentoxide being preferred.

Zinc sulfide or tin sulfide may be used as the metal sulfide, tin sulfide being preferred. Examples of metal borates are barium borates and calcium borates, zinc borate being preferred.

The novel molding materials contain, as component D), from 0.1 to 5, preferably from 0.1 to 3, in particular from 0.3 to 0.7%, by weight of an ester of at least one alcohol having 3 OH groups and one or more aliphatic mono- or dicarboxylic acids of 5 to 34, preferably 16 to 22, carbon atoms.

Mixtures of the esters can of course also be used.

The polyhydric alcohols preferably have from 3 to 6 OH groups. Examples are glycerol, trimethylolpropane, hexanetriol, erythritol, arabitol, adonitol, mannitol and dulcitol, mesoerythritol, xylitol, sorbitol and pentaerythritol being preferred.

Examples of mono- or dicarboxylic acids are caproic acid, undecanoic acid, lauric acid, tridecanoic acid, valetic acid, adipic acid, azelaic acid, palmitic acid, behenic acid and glutaric acid, stearic acid being preferred. The alcohol may be in a partially or completely esterified form. Examples of suitable esters are partially or completely esterified products obtained from pentaerythritol with stearic acid or from neopentylglycol with stearic acid. Examples of further preferred esters are glyceryl tristearate, particularly preferably pentaerythrityl tetrastearate.

The novel molding materials may contain, as component E), from 0 to 70, preferably up to 60, in particular up to 50%, by weight of conventional additives and processing assistants.

Conventional additives E) are, for example, up to 40, preferably up to 30%, by weight of elastomeric polymers (often also referred to as impact modifiers, elastomers or rubbers).

Very generally, these are copolymers which are preferably composed of at least two of the following monomers: ethylene, propylene, butadiene, isobutene, isoprene, chloroprene, vinyl acetate, styrene, acrylontrile and acrylates and methacrylates where the alcohol component is of 1 to 18 carbon atoms.

Such polymers are described, for example, in Houben-Weyl, Methoden der organischen Chemie, Vol. 14/1 (Georg-Thieme-Verlag, Stuttgart, 1961), pages 392 to 406, and in the monograph by C. B. Bucknail, Toughened Plastics (Applied Science Publishers, London, 1977).

Some preferred types of such elastomers are presented below.

Preferred types of such elastomers are the ethylene/propylene (EPM) and ethylene/propylene/diene (EPDM) rubbers.

EPM rubbers generally have virtually no double bonds, whereas EPDM rubbers may have from 1 to 20 double bonds per 100 carbon atoms.

Examples of diene monomers for EPDM rubbers are conjugated dienes, such as isoprene and butadiene, nonconjugated dienes of 5 to 25 carbon atoms, such as penta-1,4-diene, hexa-1,4-diene, hexa-1,5-diene, 2,5-dimethylhexa-1,5-diene and octa-1,4-diene, cyclic dienes, such as cyclopentadiene, cyclohexadienes, cyclooctadienes and dicyclopentadiene, and alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0.2.6]-3, 8-decadiene and mixtures thereof. Hexa-1,5-diene, 5-ethylidenenorbornene and dicyclopentadiene are preferred. The diene content of the EPDM rubbers is preferably from 0.5 to 50, in particular from 1 to 8%, by weight, based on the total weight of the rubber.

EPM and EPDM rubbers can preferably also be grafted with reactive carboxylic acids or derivatives thereof. Examples of these are acrylic acid, methacrylic acid and derivatives thereof, eg. glycidyl (meth)acrylate, and maleic anhydride.

A further group of preferred rubbers comprises copolymers of ethylene with acrylic acid and/or methacrylic acid and/or the esters of these acids. The rubbers may also contain dicarboxylic acids, such as maleic acid and fumaric acid, or derivatives of these acids, for example esters and anhydrides, and/or epoxy-containing monomers. These dicarboxylic acid derivatives and epoxy-containing monomers are preferably incorporated in the rubber by adding to the monomer mixture dicarboxyl- or epoxy-containing monomers of the general formula I or II or III or IV

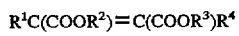  (I)

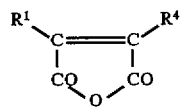  (II)

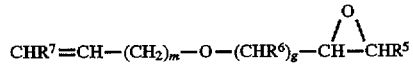  (III)

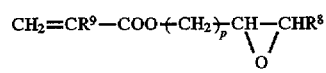  (IV)

where $R^1$ to $R^9$ are each hydrogen or alkyl of 1 to 6 carbon atoms where m is an integer from 0 to 20, g is an integer from 0 to 10 and p is an integer from 0 to 5.

$R^1$ to $R^9$ are each preferably hydrogen, m being 0 or 1 and g being 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and epoxy-containing esters of acrylic acid and/or methacrylic acid, such as glycidyl acrylate, glycidyl methacrylate and the esters with tertiary alcohols, such as tert-butyl acrylate. Although the latter have no free carboxyl groups, they resemble the free acids in their behavior and are therefore referred to as monomers having latent carboxyl groups.

Advantageously, the copolymers consist of from 50 to 98% by weight of ethylene and from 0.1 to 20% by weight of epoxy-containing monomers and/or methacrylic acid and/or monomers containing anhydride groups, the remaining amount comprising (meth)acrylates.

Copolymers of from 50 to 98, in particular from 55 to 95%, by weight of ethylene, from 0.1 to 40, in particular from 0.3 to 20%, by weight of glycidyl acrylate and/or glycidyl methacrylate, (meth)acrylic acid and/or maleic anhydride and from 1 to 45, in particular from 10 to 40%, by weight of n-butyl acrylate and/or 2-ethylhexyl acrylate are particularly preferred.

Further preferred esters of acrylic and/or methacrylic acid are the methyl, ethyl, propyl, isobutyl and tert-butyl esters.

In addition, vinyl esters and vinyl ethers may be used as comonomers.

The ethylene copolymers described above can be prepared by processes known per se, preferably by random copolymerization under high pressure at elevated temperatures. Corresponding processes are generally known.

Other preferred elastomers are emulsion polymers, the preparation of which is described, for example, by Blackley in the monograph Emulsion Polymerization. The emulsifiers and catalysts which may be used are known per se.

Homogeneous elastomers or those having a shell structure may in principle be used. The shell-like structure is determined by the order of the addition of the individual monomers; the morphology of the polymers too is influenced by this order of addition.

Acrylates, eg. n-butyl acrylate and 2-ethylhexyl acrylate, corresponding methacrylates, butadiene and isoprene and mixtures thereof may be mentioned here merely as typical monomers for the preparation of the rubber part of the elastomers. These monomers may be copolymerized with further monomers, eg. styrene, acrylonitrile, vinyl ethers and further acrylates or methacrylates, such as methyl methacrylate, methyl acrylate, ethyl acrylate and propyl acrylate.

The soft or rubber phase (having a glass transition temperature of less than 0° C.) of the elastomers may be the core, the outer shell or a middle shell (in the case of elastomers having a structure comprising more than two shells); in the case of multi-shell elastomers, it is also possible for a plurality of shells to consist of a rubber phase.

If the elastomer is composed of one or more hard components (having glass transition temperatures of more than 20° C.) in addition to the rubber phase, these are generally prepared by polymerization of the styrene, acrylonitrile, methacrylonitrile, α-methylstyrene, p-methylstyrene, acrylates and methacrylates, such as methyl acrylate, ethyl acrylate and methyl methacrylate, as main monomers. Here too, smaller amounts of other comonomers may also be used.

In some cases, it has proven advantageous to use emulsion polymers which have reactive groups at the surface. Such groups are, for example, epoxy, carboxyl, latent carboxyl, amino or amido groups and functional groups which can be introduced by the concomitant use of monomers of the general formula

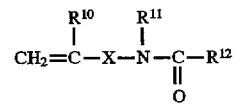

where $R^{10}$ is hydrogen or $C_1$–$C_4$-alkyl, $R^{11}$ is hydrogen, $C_1$–$C_{10}$-alkyl or aryl, in particular phenyl, $R^{12}$ is hydrogen, $C_1$–$C_{10}$-alkyl, $C_6$–$C_{12}$-aryl or —$OR^{13}$ $R^{13}$ is $C_1$–$C_8$alkyl or $C_6$–$C_{12}$-aryl, each of which may be unsubstituted or substituted by O- or N-containing groups, X is a chemical bond, $C_1$–$C_{10}$-alkylene or $C_6$–$C_{12}$-arylene or

Y is O—Z or NH—Z and

Z is $C_1$–$C_{10}$-alkylene or $C_6$–$C_{12}$-arylene.

The graft monomers described in EP-A 208 187 are also suitable for the introduction of reactive groups at the surface.

Further examples are acrylamide, methacrylamide and substituted esters of acrylic acid or methacrylic acid, such as (N-tert-butylamino)ethyl methacrylate, (N,N-dimethylamino)ethyl acrylate or (N,N-dimethylamino) methyl acrylate and (N,N-diethylamino)ethyl acrylate.

The particles of the rubber phase may furthermore be crosslinked. Examples of monomers having a crosslinking action are buta-1,3-diene, divinylbenzene, diallyl phthalate and dihydro-dicyclopentadienyl acrylate and the compounds described in EP-A 50 265.

Graft-linking monomers, ie. monomers having two or more polymerizable double bonds which react at different rates during the polymerization, may also be used. Preferably used compounds are those in which at least one reactive group polymerizes at roughly the same rate as the other monomers while the other reactive group (or reactive groups) polymerizes (polymerize), for example, substantially more slowly. The different polymerization rates result in a certain proportion of unsaturated double bonds in the rubber. If a further phase is subsequently grafted onto such a rubber, some or all of the double bonds present in the rubber react with the graft monomers with the formation of chemical bonds, ie. the grafted phase is at least partly linked by chemical bonds to the grafting base.

Examples of such graft-linking monomers are allyl-containing monomers, in particular allyl esters of ethylenically unsaturated carboxylic acids, such as allyl acrylate, allyl methacrylate, diallyl maleate, diallyl fumarate, diallyl itaconate or the corresponding monoallyl compounds of these dicarboxylic acids. There is also a large number of further suitable graft-linking monomers; for further details, reference may be made to, for example, U.S. Pat. No. 4,148,846.

In general, the amount of these crosslinking monomers in the polymeric impact modifier is up to 5, preferably not more than 3%, by weight, based on the polymeric impact modifier.

Some preferred emulsion polymers are shown below. Graft polymers having a core and at least one outer shell may be mentioned here first and have the following composition:

| Type | Monomers for the core | Monomers for the shell |
|---|---|---|
| I | buta-1,3-diene, isoprene, n-butyl acrylate, ethylhexyl acrylate or mixtures thereof | styrene, acrylonitrile, ethyl methacrylate |
| II | as for I, but with the concomitant use of crosslinking agents | as for I |
| III | as for I or II | n-butyl acrylate, ethyl acrylate, methyl acrylate, buta-1,3-diene, isoprene, ethylhexyl acrylate |
| IV | as for I or II | as for I or III, but with the concomitant use of monomers having reactive groups as described herein |
| V | styrene, acrylonitrile, methyl methacrylate or mixtures thereof | first shell comprising monomers as described under I and II for the core second shell as described under I or IV for the shell |

Particularly preferred graft polymers are ABS, ASA and SAN polymers.

These graft polymers are used in particular for toughening polycarbonate or polybutylene terephthalate (PBT), if desired in a mixture with polyethylene terephthalate, in amounts of up to 40, preferably up to 30%, by weight, based on the components A to E. Particularly preferred compositions of the novel molding materials contain:

A) from 30 to 80% by weight of a polycarbonate or polybutylene terephthalate or polyethylene terephthalate or a mixture thereof
B) from 1 to 20% by weight of decabromodiphenylethane
C) from 1 to 25% by weight of a metal oxide or metal sulfide or metal borate or a mixture thereof,
D) from 0.1 to 5% by weight of an ester of at least one alcohol having at least 3 OH groups and one or more aliphatic mono- or dicarboxylic acids of 5 to 34 carbon atoms,
E1) from 1 to 40% by weight of an ASA, SAN or ABS graft polymer or a mixture thereof
E2) from 1 to 40% by weight of a fibrous or particulate filler or a mixture thereof,
the percentages by weight of components A) to E) summing to 100%.

Such polycarbonate blend products are commercially available, for example, under the trade name Terblend® from BASF AG. The blends based on PBT with ASA are available under the trade name Ultradur® S (formerly Ultrablend®) from BASF AG.

Instead of graft polymers having a multi-shell structure, it is also possible to use homogeneous, ie. single-shell, elastomers comprising buta-1,3-diene, isoprene and n-butyl acrylate or copolymers thereof. These products, too, can be prepared by the concomitant use of crosslinking monomers or monomers having reactive groups.

Examples of preferred emulsion polymers are n-butyl acrylate/(meth)acrylic acid copolymers, n-butyl acrylate/glycidyl acrylate or n-butyl acrylate/glycidyl methacrylate copolymers, graft polymers having an inner core comprising n-butyl acrylate or based on butadiene and an outer shell comprising the abovementioned copolymers and copolymers of ethylene with comonomers which donate reactive groups.

The elastomers described can also be prepared by other conventional methods, for example by suspension polymerization.

Silicone rubbers, as described in DE-A 37 25 576, EP-A 235 690, DE-A 38 00 603 and EP-A 319 290, are likewise preferred.

It is of course also possible to use mixtures of the abovementioned rubber types.

Examples of fibrous or particulate fillers are carbon fibers, glass fibers, glass beads, amorphous silica, asbestos, calcium silicate, calcium metasilicate, magnesium carbonate, kaolin, chalk, powdered quartz, mica, barium sulfate and feldspar, which are used in amounts of up to 50, in particular up to 40%, by weight, preferably for mixtures of polyesters with ASA, ABS or SAN rubbers, in amounts of from 5 to 35% by weight.

The novel thermoplastic molding materials may contain, as component E), conventional processing assistants, such as stabilizers, antioxidants, heat stabilizers and UV stabilizers, lubricants and mold release agents, colorants, such as dyes and pigments, nucleating agents, plasticizers, etc.

Examples of antioxidants and heat stabilizers are sterically hindered phenols, hydroquinones, aromatic secondary amines, such as diphenylamines, various substituted members of these groups and mixtures thereof in concentrations of up to 1% by weight, based on the weight of the thermoplastic molding materials.

Examples of UV stabilizers, which are generally used in amounts of up 2% by weight, based on the molding material, are various substituted resorcinols, salicylates, benzotriazoles and benzophenones.

Organic dyes, such as nigrosine, and pigments, such as titanium dioxide, cadmium sulfide, cadmium selenide, phthalocyanines, ultramarine blue and carbon black, may furthermore be added as colorants.

Sodium phenylphosphinate, alumina, silica and, preferably, talc may be used as nucleating agents.

Lubricants and mold release agents, which are usually used in amounts of up to 1% by weight, are preferably long-chain fatty acids (eg. stearic acid or behenic acid), salts thereof (eg. calcium stearate or zinc stearate) and amide derivatives (eg. ethylenebisstearylamide) or montan waxes (mixtures of straight-chain saturated carboxylic acids having chain lengths of from 28 to 32 carbon atoms) and low molecular weight polyethylene or polypropylene waxes.

Examples of plasticizers are dioctyl phthalate, dibenzyl phthalate, butyl benzyl phthalate, hydrocarbon oils and N-(n-butyl)-benzenesulfonamide.

The novel molding materials may also contain from 0 to 2% by weight of fluorine-containing ethylene polymers. These are ethylene polymers having a fluorine content of from 55 to 76, preferably from 70 to 76%, by weight.

Examples of these are polytetrafluoroethylene (PTFE), tetrafluoroethylene/hexafluoroethylene copolymers and tetrafluoroethylene copolymers with relatively small amounts (as a rule up to 50% by weight) of copolymerizable ethylenically unsaturated monomers. These are described, for example, by Schildknecht in Vinyl and Related Polymers, Wiley Publishers, 1952, pages 484 to 494, and by Wall in Fluoropolymers (Wiley Interscience, 1972).

These fluorine-containing ethylene polymers are homogeneously distributed in the molding materials and preferably have a particle size $d_{50}$ (the number average) of from 0.05 to 10 µm, in particular from 0.1 to 5 µm. These small particle sizes may be particularly preferably achieved by using aqueous dispersions of fluorine-containing ethylene polymers and incorporating them into a polyester melt.

Minerals and fillers are, if required, treated with an adhesion promoter for better compatibility with the thermoplastic polyester. Glycidyl-, vinyl- and aminoalkyltrialkoxysilanes are preferred.

The novel thermoplastic molding materials can be prepared by processes known per se, by mixing the starting components in a conventional mixing apparatus, such as an extruder, a Brabender mill or a Banbury mill, and then carrying out the extrusion. After the extrusion, the extrudate can be cooled and comminuted. It is also possible to premix individual components and then to add the remaining starting materials individually and/or likewise as a mixture. The mixing temperatures are as a rule from 230° to 290° C.

In a preferred procedure, the components B) to D) and, if required, conventional additives E) can be mixed with a polyester prepolymer, compounded and granulated. The granules obtained are then subjected to continuous or batchwise solid-phase condensation under an inert gas at a temperature below the melting point of component A), until the desired viscosity is obtained.

The novel thermoplastic molding materials have good flameproof properties in combination with good creep resistance. They are suitable for the production of fibers, films and moldings, in particular for applications in the electrical and electronics sector. They are used in particular in lamp parts, such as lamp sockets and lamp holders, plugs and multipoint connectors, coil formers, housings for capacitors or contactors and fuse switches, relay housings and reflectors.

EXAMPLES

Component A/1): Polybutylene terephthalate having a viscosity number of 130 ml/g, measured in 0.5% strength by weight solution in a 1:1 phenol/o-dichlorobenzene mixture at 25° C., and containing 34 meq/kg of terminal carboxyl groups (Ultradur® B 4500 from BASF AG).

Component A/2): Polyethylene terephthalate having a viscosity number of 77 ml/g, determined as for A/1.

Determination of the terminal carboxyl groups:

100 mg of polyester were dissolved in 7 ml of nitrobenzene at 200° C. This solution was cooled to 150° C. and diluted with 7 ml of a mixture of 2 g of potassium acetate per 1 of solution, the solution consisting of 10% by weight of water and 90% by weight of isopropanol. Potassium was bound to the polyester, and the liberated acetic acid was titrated potentiometrically.

Component B): Decabromodiphenylethane (Saytex® 8010, Ethyl Corporation) Bromine content: 82%

Component C): Antimony trioxide having a density of from 5.2 to 5.8 g/cm$^3$

Component D): Tetrastearate of pentaerythritol

Component E/1): Graft copolymer comprising an acrylonitrile/styrene core and an acrylonitrile shell (ASA) having a flowability of 12 ml/10 min, measured according to ISO 1133 at 220° C./21.6 kg load.

Component E/2): Glass fibers having an average fiber diameter of 10 µm.

The components A) to E) were mixed in a twin-screw extruder at from 250° to 260° C. and extruded into a waterbath. After granulation and drying, test specimens were produced by injection molding on an injection molding machine and were tested.

The fire test was carried out according to UL 94 on 1/16 inch test specimens with conventional conditioning. The creep resistance was determined according to IEC 112/1979, and the impact strength according to ISO 179/1eU.

The flow length was determined in a spiral mold at a melt temperature of 260° C. (experiments 1 to 9, Table 2) or of 275° C. (experiments 10 to 13, Table 2) and at a mold temperature of 80° C.

The composition of the molding materials and the results of the measurements are shown in the tables.

TABLE 1

| Example | 1* | 2* | 3* | 4* | 5* | 6 |
|---|---|---|---|---|---|---|
| Component A/1) [% by weight] | 100 | 99.5 | 90 | 85 | 95 | 84.5 |
| Component B) [% by weight] |  |  | 10 | 10 |  | 10 |
| Component C) [% by weight] |  |  |  | 5 | 5 | 5 |
| Component D) [% by weight] |  | 0.5 |  |  |  | 0.5 |
| UL 94 1/16" | V-- | V-- | V-1 | V-0 | V-- | V-0 |
| CTI [V] | 600 | 600 | 250 | 175 | 325 | 250 |
| Impact strength [kJ/m$^2$] | no fracture | no fracture | 51 | 45 | 55 | 47 |

*comparative examples

TABLE 2

| Example | 1* | 2* | 3* | 4* | 5* | 6 | 7* | 8* | 9 | 10* | 11* | 12* | 13 |
|---|---|---|---|---|---|---|---|---|---|---|---|---|---|
| Comp. A/1) [% by weight] | 100 | 99.5 | 90 | 85 | 95 | 84.5 | 61 | 56 | 55.5 | 40 | 31 | 26 | 25.5 |
| Comp. A/2) [% by weight] | | | | | | | | | | 10 | 10 | 10 | 10 |
| Comp. B [% by weight] | | | 10 | 10 | | 10 | 9 | 9 | 9 | | 9 | 9 | 9 |
| Comp. C [% by weight] | | | | 5 | 5 | 5 | | 5 | 5 | | | 5 | 5 |
| Comp. D [% by weight] | | 0.5 | | | | 0.5 | | | 0.5 | | | | 0.5 |
| Comp. E/1) [% by weight] | | | | | | | | | | 20 | 20 | 20 | 20 |
| Comp. E/2) [% by weight] | | | | | | | 30 | 30 | 30 | 30 | 30 | 30 | 30 |
| UL 94 1/16" | V— | V— | V-1 | V-0 | V— | V-0 | V-0 | V-0 | V-0 | V— | V-1 | V-0 | V-0 |
| CTI [V] | 600 | 600 | 250 | 200 | 325 | 225 | 200 | 225 | 225 | 600 | 175 | 175 | 250 |
| $a_n$ Impact strength [kJ/m$^2$] | no fracture | no fracture | 51 | 45 | 55 | 47 | 60 | 62 | 65 | 35 | 36 | 33 | 47 |
| Flow length [cm] | — | — | 19 | 22 | 21 | 28 | 19 | 20 | 29 | 27 | 30 | 29 | 39 |

We claim:

1. A flameproofed thermoplastic molding material containing
   A) from 10 to 97.9% by weight of a thermoplastic polyester,
   B) from 1 to 20% by weight of decabromodiphenylethane,
   C) from 1 to 15% by weight of a metal oxide or metal sulfide or metal borate or a mixture thereof,
   D) from 0.1 to 5% by weight of an ester of at least one alcohol having at least 3 OH groups and one or more aliphatic mono- or dicarboxylic acids of 5 to 34 carbon atoms and
   E) from 0 to 70% by weight of stabilizers, antioxidants, lubricants, mold release agents, plasticizers, fluorine-containing ethylene polymers, minerals and fillers E,
   the percentages by weight of the components A) to E) summing to 100%.

2. A flameproofed thermoplastic molding material as defined in claim 1, in which up to 90% by weight, based on A) of the component A) is replaced with a polycarbonate.

3. A flameproofed thermoplastic molding material as defined in claim 1, in which the component A) is polyethylene terephthalate or polybutylene terephthalate or a mixture thereof.

4. A flameproofed thermoplastic molding material as defined in claim 1, in which the component A) contains up to 100 meq of terminal carboxyl groups per kg of polyester.

5. A flameproofed thermoplastic molding material as defined in claim 1, in which the component C) is antimony trioxide.

6. A flameproofed thermoplastic molding material as defined in claim 1, in which the component D) is pentaerythrityl tetrastearate.

7. A flameproofed thermoplastic molding material containing
   A) from 30 to 80% by weight of a polycarbonate or polybutylene terephthalate or polyethylene terephthalate or a mixture thereof
   B) from 1 to 20% by weight of decabromodiphenylethane,
   C) from 1 to 25% by weight of a metal oxide or metal sulfide or metal borate or a mixture thereof,
   D) from 0.1 to 5% by weight of an ester of at least one alcohol having at least 3 OH groups and one or more aliphatic mono- or dicarboxylic acids of 5 to 34 carbon atoms,
   E1) from 1 to 40% by weight of an ASA, SAN or ABS graft polymer or a mixture thereof
   E2) from 1 to 40% by weight of a fibrous or particulate filler or a mixture thereof,
   the percentages by weight of components A) to E) summing to 100%.

8. A molding formed from a flameproofed thermoplastic molding material as defined in claim 1.

9. A lamp socket, lamp holder, plug, multipoint connector, coil former, capacitor housing, contactor housing, fuse switch, relay housing or a reflector formed from a flameproofed thermoplastic molding material as defined in claim 1.

* * * * *

UNITED STATES PATENT AND TRADEMARK OFFICE
CERTIFICATE OF CORRECTION

PATENT NO.: 5,712,336

DATED: January 27, 1998

INVENTOR(S): GAREISS et al.

It is certified that error appears in the above-identified patent and that said Letters Patent is hereby corrected as shown below:

On the cover page, insert the following priority information:

--[30]   Foreign Application Priority Data

April 3, 1995   [DE]   Germany  .................. 195 12 407.3--.

Signed and Sealed this

Fourteenth Day of April, 1998

Attest:

BRUCE LEHMAN

Attesting Officer

Commissioner of Patents and Trademarks